US012741744B2

(12) United States Patent
Sobanski et al.

(10) Patent No.: US 12,741,744 B2
(45) Date of Patent: Sep. 22, 2026

(54) OPEN ROTOR AIRCRAFT PROPULSION SYSTEM WITH ANTI-ICING SYSTEM

(71) Applicant: RTX Corporation, Farmington, CT (US)

(72) Inventors: Jon E. Sobanski, Glastonbury, CT (US); Jeffrey T. Morton, Manchester, CT (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 36 days.

(21) Appl. No.: 18/538,300

(22) Filed: Dec. 13, 2023

(65) Prior Publication Data

US 2025/0197013 A1 Jun. 19, 2025

(51) Int. Cl.

*B64D 15/04* (2006.01)
*B64D 27/10* (2006.01)
*F01D 25/02* (2006.01)
*F02C 3/14* (2006.01)

(52) U.S. Cl.

CPC ............. *B64D 15/04* (2013.01); *B64D 27/10* (2013.01); *F01D 25/02* (2013.01); *F02C 3/145* (2013.01)

(58) Field of Classification Search

CPC ............ B64D 15/04; B64D 15/02; F02C 3/10
See application file for complete search history.

(56) References Cited

U.S. PATENT DOCUMENTS 2,507,044 A * 5/1950 Palmatier ............... B64D 15/02 165/231
4,765,135 A 8/1988 Lardellier
4,936,748 A 6/1990 Adamson
9,869,248 B2 1/2018 Suciu
10,202,941 B2 2/2019 Suciu
2009/0108134 A1* 4/2009 Thodiyil ................ B64D 15/04 244/134 B (Continued)

FOREIGN PATENT DOCUMENTS

FR 2967646 B1 3/2015

OTHER PUBLICATIONS

EP Search Report for EP Patent Application No. 24219926.3 dated Apr. 23, 2025.

*Primary Examiner* — Phutthiwat Wongwian
*Assistant Examiner* — Roberto Toshiharu Igue
(74) *Attorney, Agent, or Firm* — Getz Balich LLC

(57) ABSTRACT

An assembly is provided for an aircraft propulsion system. This assembly includes a propulsion module, a gas generator and an anti-icing system. The propulsion module includes an open propulsor rotor. The gas generator is configured to drive rotation of the open propulsor rotor about an axis. The gas generator includes a flowpath, a compressor section, a combustor section, a turbine section and an exhaust section. The flowpath extends through the compressor section, the combustor section, the turbine section and the exhaust section. The turbine section is axially between the combustor section and the open propulsor rotor along the axis. The anti-icing system is configured to bleed gas from the flowpath in the exhaust section to provide heated gas. The anti-icing system is configured to direct the heated gas to the propulsion module to reduce or prevent ice accumulation on an exterior surface of the propulsion module.

15 Claims, 8 Drawing Sheets

(56) References Cited

U.S. PATENT DOCUMENTS

| | | | | |
|---|---|---|---|---|
| 2011/0296811 | A1 | 12/2011 | Knott | |
| 2012/0107133 | A1 | 5/2012 | Bulin | |
| 2015/0300293 | A1* | 10/2015 | Suciu | F02C 3/045 60/805 |
| 2017/0314465 | A1 | 11/2017 | Beutin | |
| 2018/0087456 | A1 | 3/2018 | Alecu | |
| 2021/0107676 | A1* | 4/2021 | Sibbach | F02C 7/32 |
| 2021/0108572 | A1* | 4/2021 | Khalid | F01D 7/00 |
| 2021/0231058 | A1 | 7/2021 | Plante | |
| 2022/0074349 | A1 | 3/2022 | Valois | |
| 2023/0271695 | A1* | 8/2023 | Charier | F04D 29/563 244/69 |
| 2023/0323837 | A1 | 10/2023 | Ostdiek | |

* cited by examiner

OPEN ROTOR AIRCRAFT PROPULSION SYSTEM WITH ANTI-ICING SYSTEM

BACKGROUND OF THE DISCLOSURE

1. Technical Field

This disclosure relates generally to an aircraft and, more particularly, to a propulsion system for the aircraft.

2. Background Information

Various types and configurations of aircraft propulsion systems are known in the art. Various types and configurations of anti-icing systems for aircraft propulsion systems are also known in the art. While these known aircraft propulsion systems and anti-icing systems have various benefits, there is still room in the art for improvement.

SUMMARY OF THE DISCLOSURE

According to an aspect of the present disclosure, an assembly is provided for an aircraft propulsion system. This assembly includes a propulsion module, a gas generator and an anti-icing system. The propulsion module includes an open propulsor rotor. The gas generator is configured to drive rotation of the open propulsor rotor about an axis. The gas generator includes a flowpath, a compressor section, a combustor section, a turbine section and an exhaust section. The flowpath extends through the compressor section, the combustor section, the turbine section and the exhaust section from an inlet into the flowpath to an exhaust from the flowpath. The turbine section is axially between the combustor section and the open propulsor rotor along the axis. The anti-icing system is configured to bleed gas from the flowpath in the exhaust section to provide heated gas. The anti-icing system is configured to direct the heated gas to the propulsion module to reduce or prevent ice accumulation on an exterior surface of the propulsion module.

According to another aspect of the present disclosure, another assembly is provided for an aircraft propulsion system. This assembly includes a propulsion rotor, a guide vane structure, a gas generator and an anti-icing system. The propulsor rotor is rotatable about an axis. The guide vane structure includes a plurality of guide vanes arranged circumferentially about the axis. The guide vane structure is axially next to the propulsor rotor. The gas generator is configured to drive rotation of the propulsor rotor about the axis. The gas generator includes a flowpath, a compressor section, a combustor section, a turbine section and an exhaust section. The flowpath extends through the compressor section, the combustor section, the turbine section and the exhaust section from an inlet into the flowpath to an exhaust from the flowpath. The anti-icing system is configured to bleed combustion products from the flowpath in the exhaust section to provide heated gas. The anti-icing system is configured to direct the heated gas to the guide vane structure to reduce or prevent ice accumulation on the guide vanes.

According to still another aspect of the present disclosure, another assembly is provided for an aircraft propulsion system. This assembly includes a propulsion module, a gas generator and an anti-icing system. The propulsion module includes an open propulsor rotor rotatable about an axis. The gas generator is configured to power operation of the open propulsor rotor. The gas generator includes a flowpath, a compressor section, a combustor section, a turbine section and an exhaust section. The flowpath extends through the compressor section, the combustor section, the turbine section and the exhaust section from an inlet into the flowpath to an exhaust from the flowpath. The anti-icing system includes a bleed port and a passage. The bleed port is fluidly coupled to the passage and is disposed in the exhaust section along the flowpath. The passage extends into the propulsion module.

The propulsor rotor may be configured as or otherwise include an un-ducted propulsor rotor. The guide vane structure may be configured as or otherwise include an un-ducted guide vane structure.

The guide vane structure may be downstream of the propulsor rotor.

The propulsion module may also include a plurality of open guide vanes arranged circumferentially about the axis. The open guide vanes may include a first open guide vane. The first open guide vane may include the exterior surface.

The anti-icing system may include a bleed port and a passage. The bleed port may be fluidly coupled to the passage and disposed in the exhaust section along the flowpath. The passage may extend into the first open guide vane.

The anti-icing system may also include an outlet. The outlet may be disposed in the exterior surface. The passage may fluidly couple the bleed port to the outlet.

The anti-icing system may also include an outlet. The outlet may be disposed in the exhaust section downstream of the bleed port along the flowpath. The passage may fluidly couple the bleed port to the outlet.

The turbine section may be axially between the combustor section and the open guide vanes along the axis.

The open propulsor rotor may include the exterior surface.

The propulsion module may also include a nose cone. The nose cone may include the exterior surface.

The nose cone may be configured as a spinner rotatable with the open propulsor rotor about the axis.

The nose cone may be a configured as a stationary structure of the propulsion module.

The anti-icing system may include a mixing valve configured to mix ambient air with the gas bled from the flowpath in the exhaust section to provide the heated gas.

The heated gas may only include the gas bled from the flowpath in the exhaust section.

The turbine section may include a free power turbine rotor. The free power turbine rotor may be coupled to and configured to drive the rotation of the open propulsor rotor.

The assembly may also include a geartrain coupling the free power turbine rotor to the open propulsor rotor.

The free power turbine rotor may be rotatable about the axis.

The axis may be a first axis. The free power turbine rotor may be rotatable about a second axis that is offset from the first axis.

The gas generator may include a rotating assembly rotatable about the axis. The rotating assembly may include a compressor rotor, a turbine rotor and a shaft coupling the turbine rotor to the compressor rotor. The compressor rotor may be in the compressor section. The turbine rotor may be in the turbine section.

The axis may be a first axis. The gas generator may include a rotating assembly rotatable about a second axis offset from the first axis. The rotating assembly may include a compressor rotor, a turbine rotor and a shaft coupling the turbine rotor to the compressor rotor. The compressor rotor may be in the compressor section. The turbine rotor may be in the turbine section.

The second axis may be laterally offset from the first axis.

The second axis may be angularly offset from the first axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
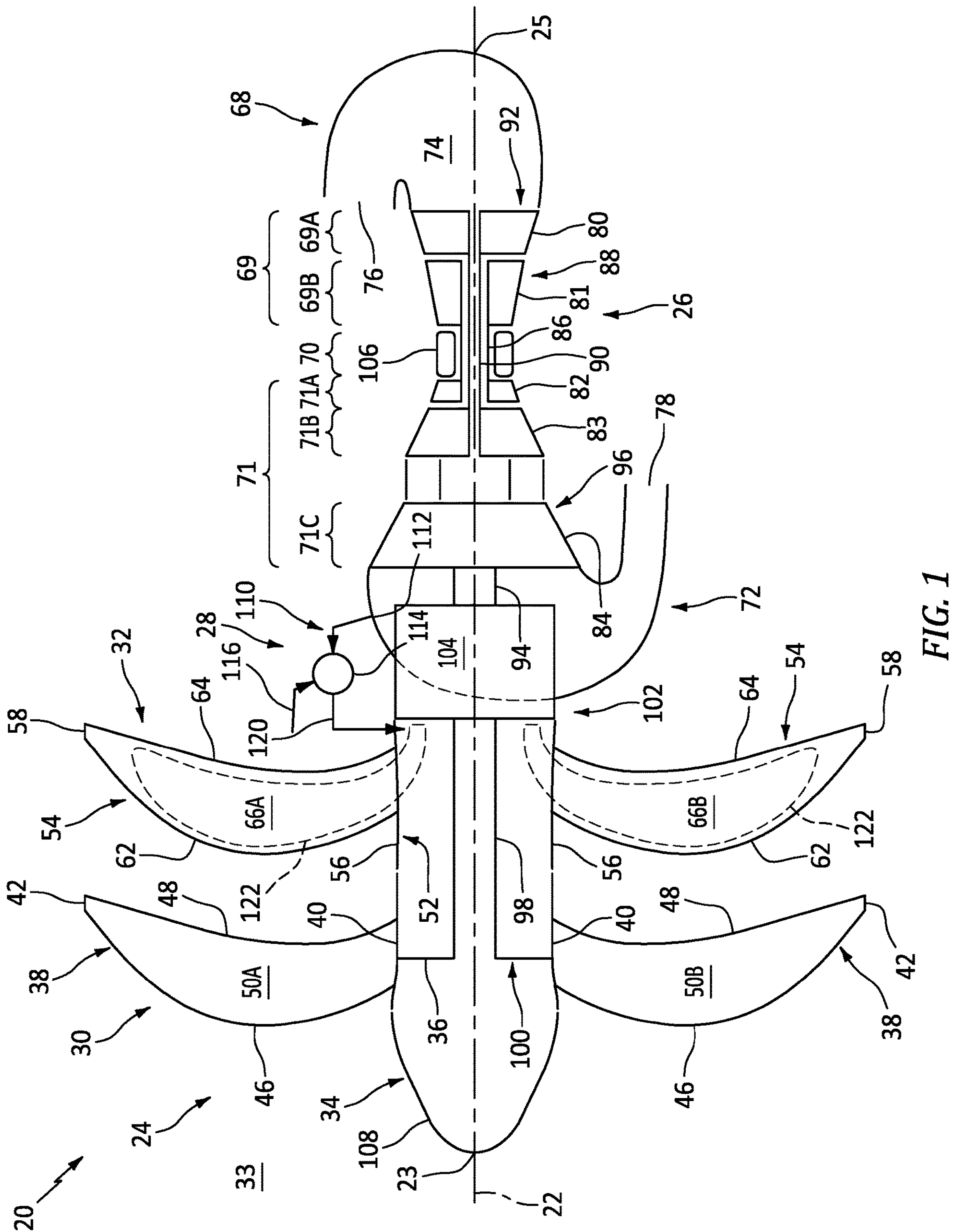
FIG. 1 is a sectional schematic illustration of a propulsion system for an aircraft.

FIG. 1 is a side schematic illustration of a propulsion system 20 for an aircraft. The aircraft may be an airplane, a drone (e.g., an unmanned aerial vehicle (UAV)) or any other manned or unmanned aerial vehicle or system. The aircraft propulsion system 20 may be configured as an open rotor propulsion system. The aircraft propulsion system 20 of FIG. 1, for example, extends axially along an axis 22 between a forward, upstream end 23 of the aircraft propulsion system 20 and an aft, downstream end 25 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20. The aircraft propulsion system 20 of FIG. 1 includes a propulsion module 24, a gas generator 26 (e.g., a reverse flow gas generator) and an anti-icing system 28 servicing the propulsion module 24.

The propulsion module 24 of FIG. 1 includes an open propulsor rotor 30 and an open guide vane structure 32. Here, the term "open" may describe a component which is open to an environment 33 (e.g., an ambient environment) external to the aircraft propulsion system 20 and its propulsion module 24. The propulsion module members 30, 32 of FIG. 1, for example, are un-ducted and unshrouded components of the aircraft propulsion system 20 and its propulsion module 24. The propulsion module 24 of FIG. 1 also includes a nose cone 34 disposed at (e.g., on, adjacent or proximate) the propulsion system upstream end 23. Briefly, this nose cone 34 may be configured as a spinner which is rotatable with the propulsor rotor 30 about the axis 22. Alternatively, the nose cone 34 may be configured as a stationary structure of the propulsion module 24.

The propulsor rotor 30 includes a rotor base 36 (e.g., a disk or a hub) and a plurality of open propulsor blades 38 (e.g., airfoils). The propulsor blades 38 are arranged circumferentially around the rotor base 36 and the axis 22 in an array. Each of the propulsor blades 38 is connected to (e.g., formed integral with or otherwise attached to) the rotor base 36.

Figures 2, 3:
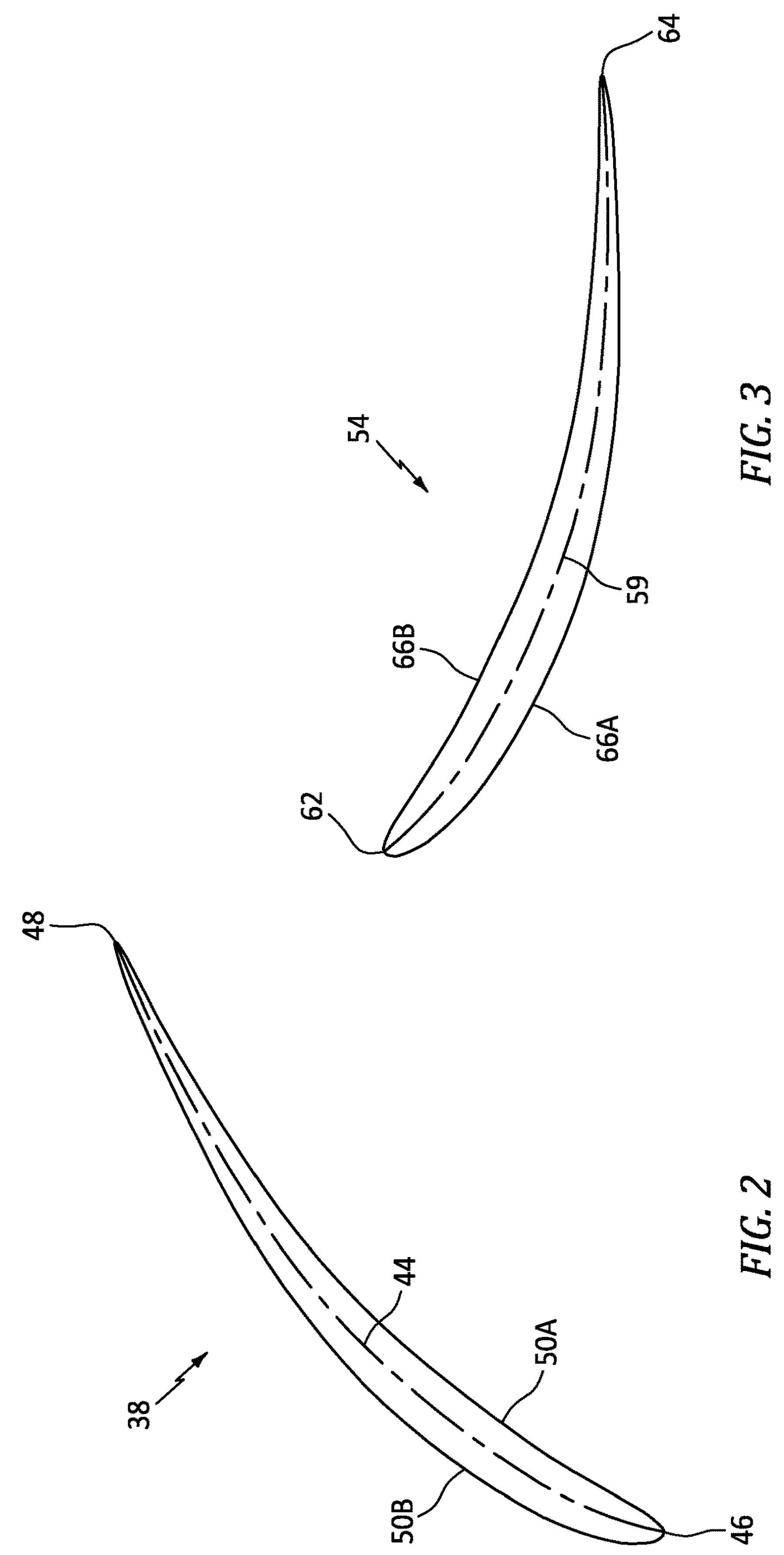
FIG. 2 is a cross-sectional illustration of an open propulsor blade.
FIG. 3 is a cross-sectional illustration of an open guide vane.

Each propulsor blade 38 projects spanwise along a span line of the respective propulsor blade 38 (e.g., radially relative to the axis 22) out from an exterior surface 40 of the rotor base 36, into the external environment 33, to an unshrouded, distal tip 42 of the respective propulsor blade 38. Each propulsor blade 38 is thereby configured as an un-ducted and unshrouded propulsor blade which is exposed to (e.g., disposed in) the surrounding external environment 33. Referring to FIG. 2, each propulsor blade 38 extends longitudinally along a mean line 44 (e.g., a camber line) of the respective propulsor blade 38 from a leading edge 46 of the respective propulsor blade 38 to a trailing edge 48 of the respective propulsor blade 38. Each propulsor blade 38 extends laterally between and to opposing side exterior surfaces 50A and 50B (generally referred to as "50") of the respective propulsor blade 38. The first blade exterior surface 50A may be a concave, pressure side surface of the respective propulsor blade 38. The second blade exterior surface 50B may be a convex, suction side surface of the respective propulsor blade 38. Each of these blade exterior surfaces 50 extends longitudinally along the blade mean line 44 between and meet at the respective blade leading edge 46 and the respective blade trailing edge 48. Referring to FIG. 1, each blade element 46, 48, 50A, 50B extends spanwise from the base exterior surface 40 to the respective blade tip 42.

The propulsor rotor 30 of FIG. 1 is arranged axially along the axis 22 between the nose cone 34 and the guide vane structure 32. The propulsor rotor 30 of FIG. 1, in particular, is arranged axially downstream of the nose cone 34 and axially upstream of the guide vane structure 32. A forward, upstream end of the propulsor rotor 30 may be disposed axially next to (e.g., adjacent, slightly spaced from) an aft, downstream end of the nose cone 34. An aft, downstream end of the propulsor rotor 30 may be disposed axially next to a forward, upstream end of the guide vane structure 32.

The guide vane structure 32 includes an inner platform 52 and a plurality of open guide vanes 54 (e.g., airfoils). The guide vanes 54 are arranged circumferentially around the inner platform 52 and the axis 22 in an array. Each of the guide vanes 54 is connected to the inner platform 52.

Each guide vane 54 projects spanwise along a span line of the respective guide vane 54 (e.g., radially relative to the axis 22) out from an exterior surface 56 of the inner platform 52, into the external environment 33, to an unshrouded, distal tip 58 of the respective guide vane 54. Each guide vane 54 is thereby configured as an un-ducted and unshrouded guide vane which is exposed to (e.g., disposed in) the surrounding external environment 33. Referring to FIG. 3, each guide vane 54 extends longitudinally along a mean line 59 (e.g., a camber line) of the respective guide vane 54 from a leading edge 62 of the respective guide vane 54 to a trailing edge 64 of the respective guide vane 54. Each guide vane 54 extends laterally between and to opposing side exterior surfaces 66A and 66B (generally referred to as "66") of the respective guide vane 54. The first vane exterior surface 66A may be a convex, suction side surface of the respective guide vane 54. The second vane exterior surface 66B may be a concave, pressure side surface of the respective guide vane 54. Each of these vane exterior surfaces 66 extends longitudinally along the vane mean line 59 between (and meet at) the respective vane leading edge 62 and the respective vane trailing edge 64. Referring to FIG. 1, each vane element 62, 64, 66A, 66B extends spanwise from the platform exterior surface 56 to the respective vane tip 58.

In some embodiments, each of the guide vanes 54 may be a fixed guide vane which is fixedly connected to the inner platform 52 and/or an internal support structure covered by the inner platform 52. In other embodiments, some or all of the guide vanes 54 may each be a variable guide vane which is pivotally connected to the inner platform 52 and/or an internal support structure covered by the inner platform 52. Some of all of the guide vanes 54, for example, may be configured to pivot about a pivot axis of the respective guide vane 54.

The guide vane structure 32 of FIG. 1 is arranged axially between the propulsor rotor 30 and one or more sections (e.g., 68-72) of the gas generator 26, or an entirety of the gas generator 26. The guide vane structure 32 of FIG. 1, in particular, is arranged axially downstream of the propulsor rotor 30 and axially upstream of the gas generator 26 and its engine sections 68-72. An aft end of the guide vane structure 32 may be disposed axially next to a forward, upstream end of the gas generator 26; e.g., relative to fluid flow outside of the gas generator 26.

The gas generator 26 of FIG. 1 includes a reverse-flow core flowpath 74, an inlet section 68, a compressor section 69, a combustor section 70, a turbine section 71 and an exhaust section 72. The compressor section 69 of FIG. 1 includes a low pressure compressor (LPC) section 69A and a high pressure compressor (HPC) section 69B. The turbine section 71 includes a high pressure turbine (HPT) section 71A, an intermediate pressure turbine (IPT) section 71B and a power turbine (PT) section 71C, which PT section 71C is a low pressure turbine (LPT) section of the aircraft propulsion system 20. The core flowpath 74 extends longitudinally in the gas generator 26 from an airflow inlet 76 into the core flowpath 74 to a combustion products exhaust 78 from the core flowpath 74. More particularly, the core flowpath 74 extends sequentially through the inlet section 68, the LPC section 69A, the HPC section 69B, the combustor section 70, the HPT section 71A, the IPT section 71B, the PT section 71C and the exhaust section 72 between the flowpath inlet 76 and the flowpath exhaust 78. The flowpath inlet 76 may be configured as an airflow inlet into the gas generator 26 or, more generally, the aircraft propulsion system 20. The flowpath exhaust 78 may be configured as a combustion products exhaust from the gas generator 26 or, more generally, the aircraft propulsion system 20.

The engine sections 69A-71C may be arranged sequentially along the axis 22 between propulsion system downstream end 25 and the propulsion system upstream end 23. With this arrangement, each engine section 71A, 71B, 71C, 72 is arranged axially along the axis 22 between (A) the propulsion module 24 and its components 30 and 32 and (B) the combustor section 70. The exhaust section 72 of FIG. 1 is also arranged axially along the axis 22 between (A) the propulsion module 24 and its components 30 and 32 and (B) the turbine section 71 and each of its sub-sections 71A, 71B and 71C. The engine sections 69A-71C of FIG. 1 are arranged within an engine housing; e.g., a case and a nacelle. The propulsor rotor 30 and the guide vane structure 32 are arranged outside of the engine housing.

Each of the engine sections 69A, 69B, 71A, 71B and 71C includes a respective bladed rotor 80-84; e.g., a ducted and/or shrouded engine rotor. Each of these engine rotors 80-84 includes a rotor base (e.g., a disk or a hub) and a plurality of rotor blades (e.g., airfoils, vanes, etc.). The rotor blades are arranged circumferentially around the respective rotor base and the axis 22 in an array. The rotor blades may also be arranged into one or more stages longitudinally along the core flowpath 74. Each of the rotor blades is connected to the respective rotor base. Each of the rotor blades projects radially (e.g., spanwise) out from the respective rotor base into the core flowpath 74 and to an unshrouded, distal tip of the respective rotor blade.

The HPC rotor 81 is coupled to and rotatable with the HPT rotor 82. The HPC rotor 81 of FIG. 1, for example, is connected to the HPT rotor 82 by a high speed shaft 86. At least (or only) the HPC rotor 81, the HPT rotor 82 and the high speed shaft 86 collectively form a high speed rotating assembly 88; e.g., a high speed spool of the gas generator 26. The LPC rotor 80 is coupled to and rotatable with the IPT rotor 83. The LPC rotor 80 of FIG. 1, for example, is connected to the IPT rotor 83 by a low speed shaft 90. At least (or only) the LPC rotor 80, the IPT rotor 83 and the low speed shaft 90 collectively form a low speed rotating assembly 92; e.g., a low speed spool of the gas generator 26. The PT rotor 84 (e.g., the PT rotor) is connected to and rotatable with a power turbine shaft 94. At least (or only) the PT rotor 84 and the power turbine shaft 94 collectively form a power turbine rotating assembly 96. The propulsor rotor 30 is connected to and rotatable with a propulsor shaft 98. At least (or only) the propulsor rotor 30 and the propulsor shaft 98 collectively form a propulsor rotating assembly 100. This propulsor rotating assembly 100 is coupled to the power turbine rotating assembly 96 through a drivetrain 102. The drivetrain 102 may be configured as a geared drivetrain, where a geartrain 104 (e.g., a transmission, a speed change device, an epicyclic geartrain, etc.) is disposed between and operatively couples the propulsor rotating assembly 100 and its propulsor shaft 98 to the power turbine rotating assembly 96 and its power turbine shaft 94. With this arrangement, the propulsor rotor 30 may rotate at a different (e.g., slower) rotational velocity than the power turbine rotating assembly 96 and its PT rotor 84. However, the drivetrain 102 may alternatively be configured as a direct drive drivetrain, where the geartrain 104 is omitted. With this arrangement, the propulsor rotor 30 and the PT rotor 84 may rotate at a common (the same) rotational velocity. Referring again to FIG. 1, each of the rotating assemblies 88, 92, 96, 100 and its members may be rotatable about the axis 22.

During operation of the aircraft propulsion system 20, ambient air within the external environment 33 is propelled by the propulsor rotor 30 across the guide vane structure 32 in an aft, downstream direction towards the propulsion system downstream end 25. The guide vane structure 32 and its guide vanes 54 condition (e.g., straighten out) the air propelled by the propulsor rotor 30, for example, to remove or reduce circumferential swirl. A major outer portion of the air propelled by the propulsor rotor 30 across the guide vane structure 32 provides forward thrust. A minor inner portion of the air propelled by the propulsor rotor 30 across the guide vane structure 32 is directed into the core flowpath 74 by the inlet section 68 and its flowpath inlet 76. This air entering the core flowpath 74 may be referred to as "core air".

The core air is compressed by the LPC rotor 80 and the HPC rotor 81 and directed into a combustion chamber 106 (e.g., an annular combustion chamber) of a combustor (e.g., an annular combustor) in the combustor section 70. Fuel is injected into the combustion chamber 106 and mixed with the compressed core air to provide a fuel-air mixture. This fuel-air mixture is ignited and combustion products thereof flow through and sequentially drive rotation of the HPT rotor 82, the IPT rotor 83 and the PT rotor 84. The rotation of the HPT rotor 82 and the IPT rotor 83 respectively drive rotation of the HPC rotor 81 and the LPC rotor 80 and, thus, compression of the air received from the flowpath inlet 76. The rotation of the PT rotor 84 (e.g., the LPT rotor) drives rotation of the propulsor rotor 30 through the drivetrain 102. The rotation of the propulsor rotor 30, in turn, propels the ambient air within the external environment 33 across the guide vane structure 32 in the aft, downstream direction. With this arrangement, the gas generator 26 powers operation of (e.g., drives rotation of) the propulsor rotor 30 during aircraft propulsion system operation.

Figure 4:
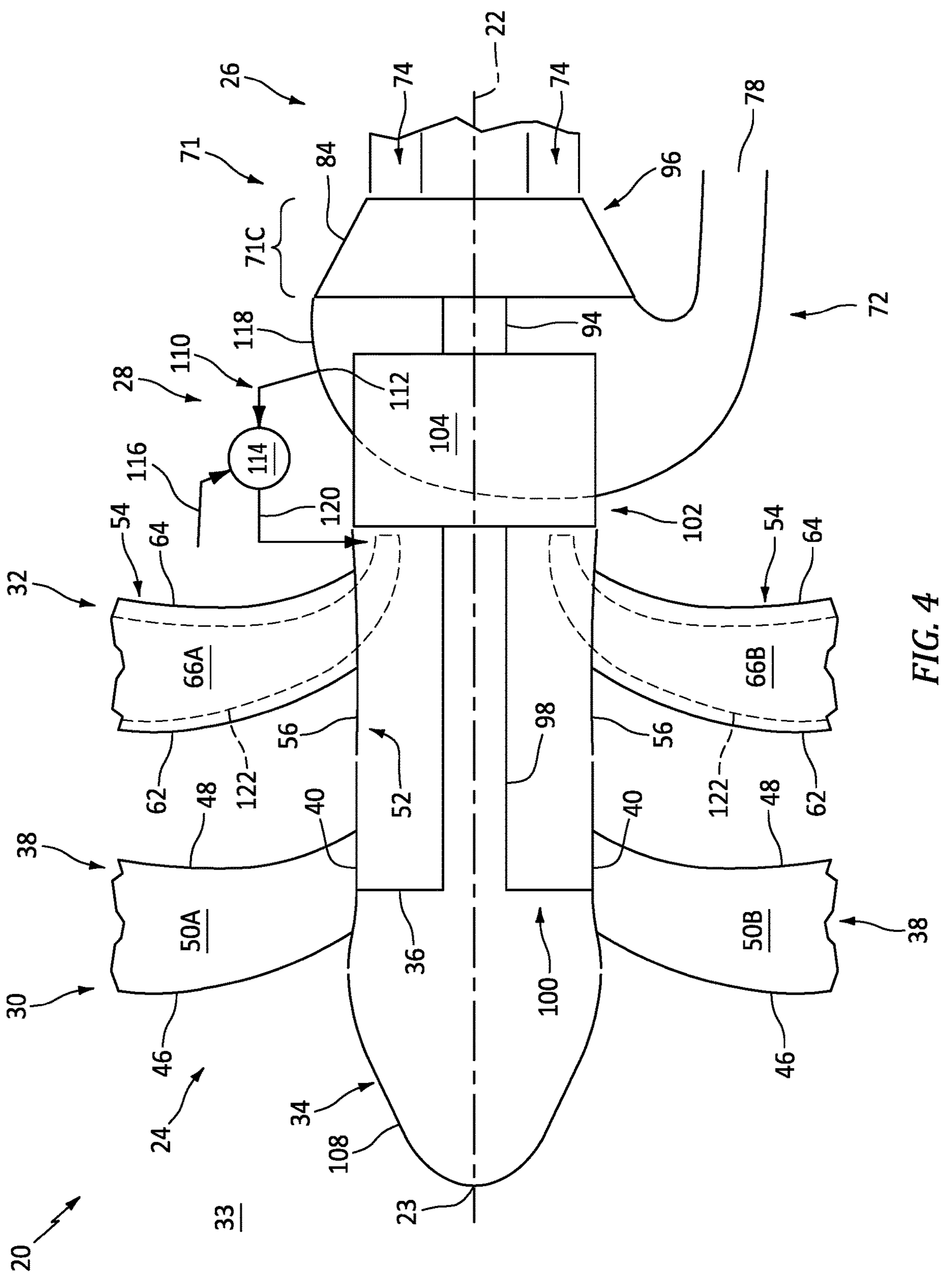
FIG. 4 is a partial side schematic illustration of the propulsion system with an anti-icing system for a guide vane structure.

Referring to FIG. 4, the anti-icing system 28 is configured to heat one or more exterior surfaces of the propulsion module 24, where each exterior surface is exposed to the ambient air within the exterior environment 33. By heating those exterior surfaces, the anti-icing system 28 may reduce or prevent ice accumulation on the heated exterior surfaces when, for example, the aircraft propulsion system 20 is operating in cold and damp environments. For ease of description, the heated exterior surfaces are generally described below as the exterior surfaces 66A, 66B of the guide vanes 54. However, as described below in further detail, it is contemplated the anti-icing system 28 may also or alternatively heat the exterior surfaces 50A, 50B of the propulsor blades 38, an exterior surface 108 of the nose cone 34 and/or one or more other exterior surfaces of the propulsion module 24.

The anti-icing system 28 of FIG. 4 includes a gas flow circuit 110 and a bleed port 112 (or multiple bleed ports). The anti-icing system 28 may also include (or omit) a mixing valve 114 and a cool air passage 116.

The bleed port 112 of FIG. 4 is disposed in the exhaust section 72 along the core flowpath 74. This bleed port 112 is configured to bleed gas—the combustion products—flowing through the core flowpath 74 within the exhaust section 72, and direct that bleed gas into the gas flow circuit 110. The bleed port 112 may be configured as or otherwise include an opening in an outer flowpath wall 118 of the exhaust section 72, which outer flowpath wall 118 forms an outer peripheral boundary of the core flowpath 74 within the exhaust section 72. Alternatively, the bleed port 112 may be configured as or otherwise include a scoop along the outer flowpath wall 118.

Figure 5:
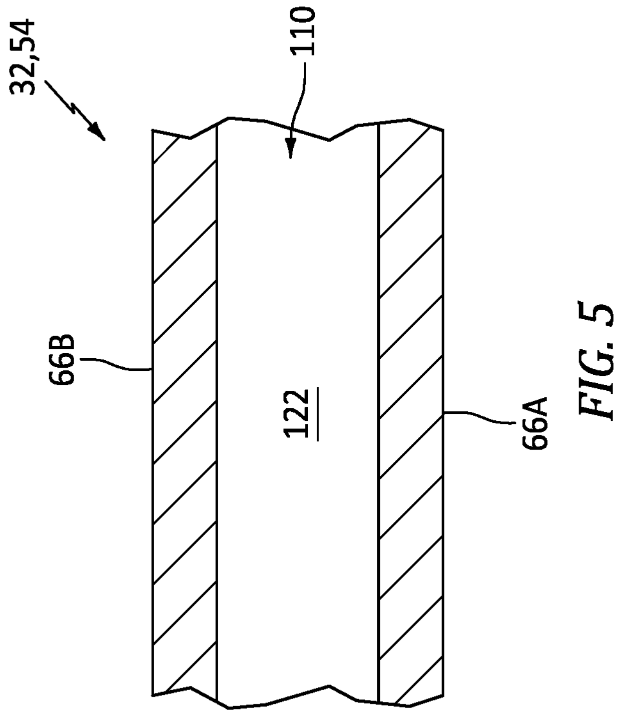
FIG. 5 is a partial sectional illustration of a portion of a guide vane with an internal passage.

The gas flow circuit 110 is configured to direct heated gas to the propulsion module 24, where the heated gas is or otherwise includes the gas bled from the core flowpath 74 by the bleed port 112. The gas flow circuit 110 of FIG. 4, in particular, is configured to direct the bleed gas from the bleed port 112 into the guide vane structure 32 and its guide vanes 54. The gas flow circuit 110 of FIG. 4, for example, includes a manifold 120 and a plurality of internal passages 122. The manifold 120 fluidly couples the bleed port 112 (or bleed ports) to the passages 122. Each of the passages 122 is thereby fluidly coupled to the bleed port 112 (or bleed ports) through the manifold 120. Each of these passages 122 extends into a respective one of the guide vanes 54. Referring to FIG. 5, each passage 122 also extends along and in close proximity to the external surfaces 66A and 66B of the respective guide vane 54 to be heated. For example, within each guide vane 54, an external skin of the guide vane 54 forming the respective exterior surface(s) 66 may also form a peripheral boundary of the respective passage 122. The heated gas flowing within the passage 122 may thereby heat the external skin and, thus, the respective exterior surface(s) 66 of the respective guide vane 54.

Referring to FIG. 4, the mixing valve 114 is disposed fluidly between the cool air passage 116 to the gas flow circuit 110. This cool air passage 116 may be configured to direct relatively cool air (e.g., the ambient air) from the external environment 33 (or another cool air source) to the mixing valve 114. The mixing valve 114 is configured to facilitate selective mixing of at least some of the cool air from the cool air passage 116 with the bleed gas within the gas flow circuit 110. For example, where a temperature of the bleed gas is equal to or above a threshold, the mixing valve 114 may facilitate the mixing of the bleed gas with the cool air to reduce a temperature of the heated gas—here, a mixture of the bleed gas and the cool air—provided to the guide vanes 54. However, where the temperature of the bleed gas is below the threshold, the mixing valve 114 may close and the heated gas provided to the guide vanes 54 may be (e.g., solely) the bleed gas.

With a reverser flow gas generator arrangement, the anti-icing system 28 of FIG. 4 (see also FIG. 1) may readily utilize the combustion products within the exhaust section 72 to supply the heated gas for heating the exterior surfaces 66 of the guide vanes 54. Moreover, with the exhaust section 72 arranged between the engine sections 68-71C (see FIG. 1) and the propulsion module 24, the bleed gas may be routed by the gas flow circuit 110 to the propulsion module 24 without passing in close proximity to fuel lines servicing the combustor section 70 and/or without passing through a firewall.

Figure 6:
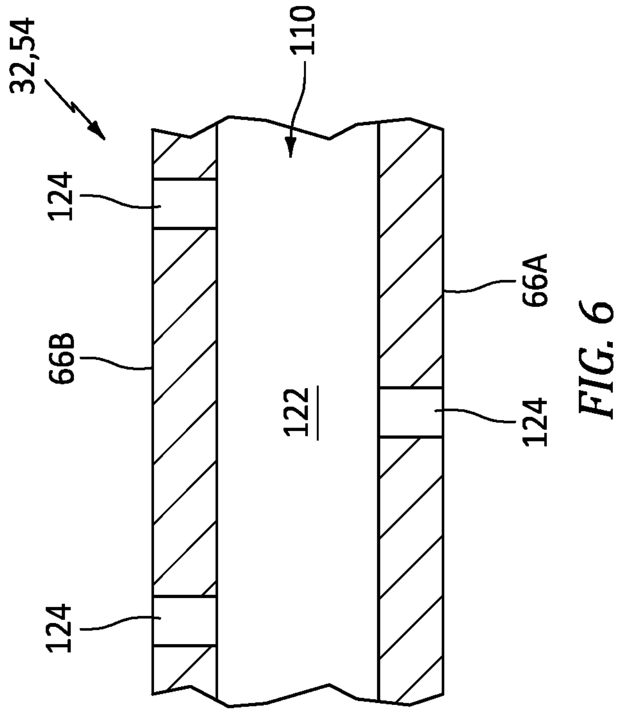
FIG. 6 is a partial sectional illustration of a portion of the guide vane with outlets from the internal passage to an external environment.
Figure 7:
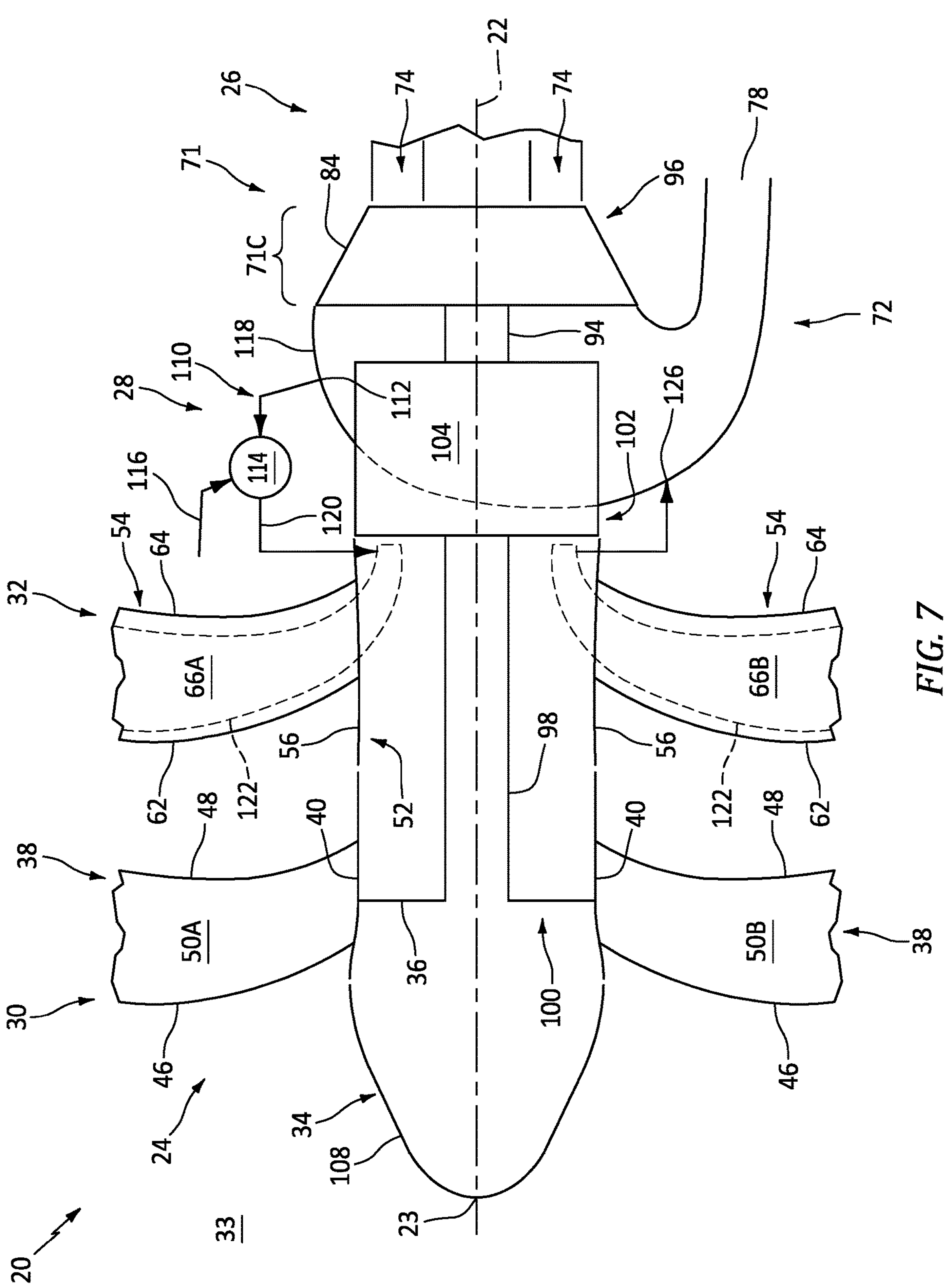
FIG. 7 is a partial sectional schematic illustration of the propulsion system with an outlet from the anti-icing system directed into an exhaust section of a gas generator.

In some embodiments, referring to FIG. 6, each passage 122 may extend to or otherwise be fluidly coupled with one or more outlets 124 in the respective propulsion module component (e.g., respective guide vane 54) being heated. The outlets 124 of FIG. 6, for example, are disposed in one or more of the exterior surfaces 66 being heated by the heated gas. In other embodiments, referring to FIG. 7, the gas flow circuit 110 and its passages 122 may be fluidly coupled with an outlet 126 (or multiple outlets) along the core flowpath 74. The outlet 126 of FIG. 7, for example, is disposed along the core flowpath 74 in the exhaust section 72, for example downstream of the bleed port 112. With this arrangement, the anti-icing system 28 and its gas flow circuit 110 may exhaust the heated gas back into the core flowpath 74 after using that heated gas to heat the respective exterior surfaces 66.

Figure 9:
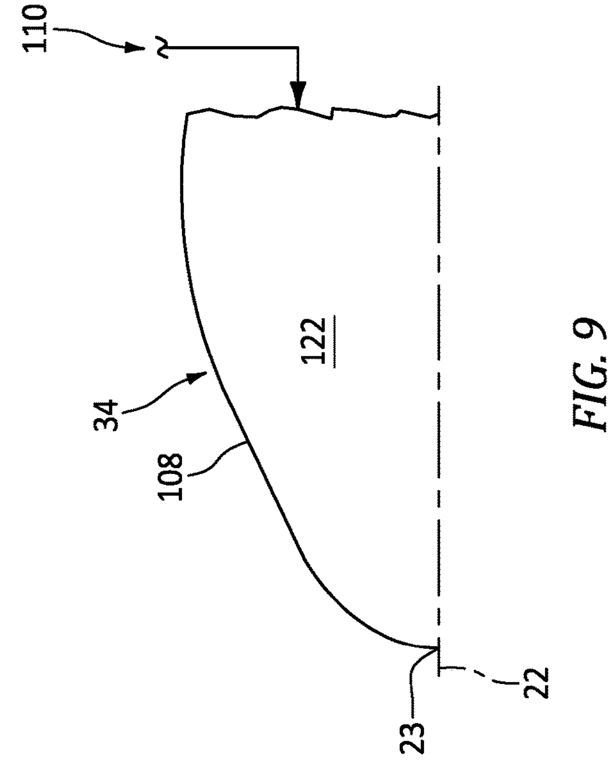
FIG. 9 is a partial sectional schematic illustration of a nose cone serviced by the anti-icing system.
Figure 8:
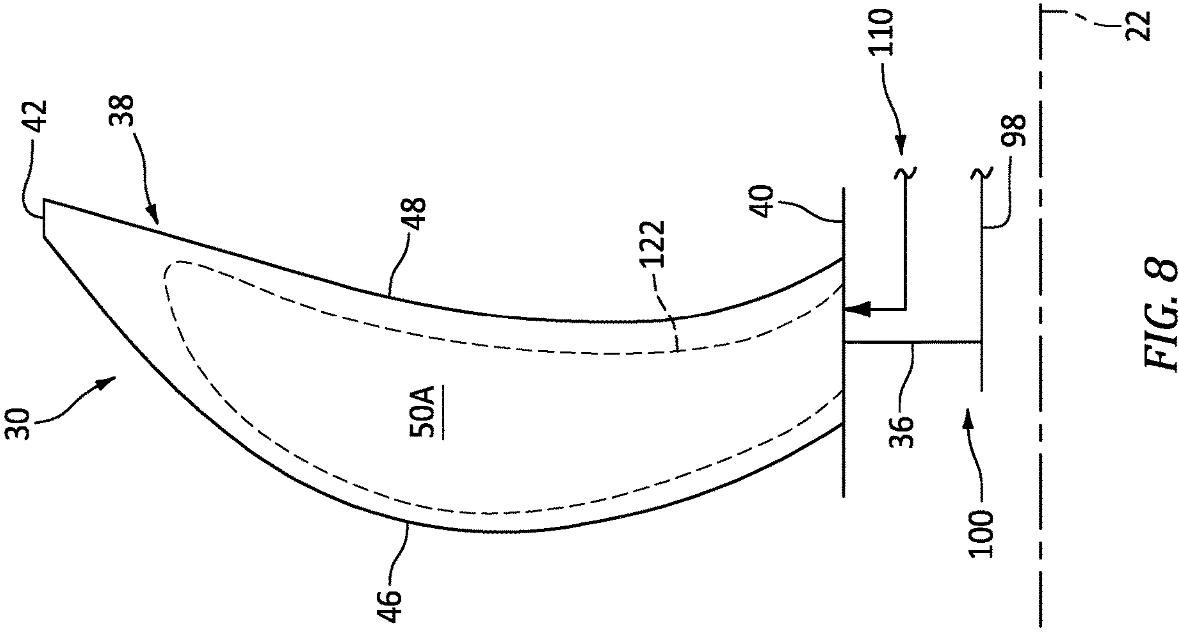
FIG. 8 is a partial sectional schematic illustration of an open propulsor rotor serviced by the anti-icing system.

Referring to FIG. 4, the exterior surfaces heated by the anti-icing system 28 are described above as being the vanes exterior surfaces 66. However, as discussed above, the anti-icing system 28 may also or alternatively heat one or more other exterior surfaces of the propulsion module 24. For example, referring to FIG. 8, one or more passages 122 of the anti-icing system 28 may also or alternatively extend into the propulsor rotor 30. Each passage 122 of FIG. 8, for example, may extend into a respective one of the propulsor blades 38 to facilitate heating of one or more of its blade exterior surfaces 50 with the heated gas. In another example, referring to FIG. 9, a passage 122 (or cavity) of the anti-icing system 28 may also or alternatively extend into the nose cone 34 to facilitate heating of the nose cone exterior surface 108 with the heated gas. The anti-icing system 28 of the present disclosure, however, is not limited to heating the foregoing exemplary exterior surfaces.

Figure 10:
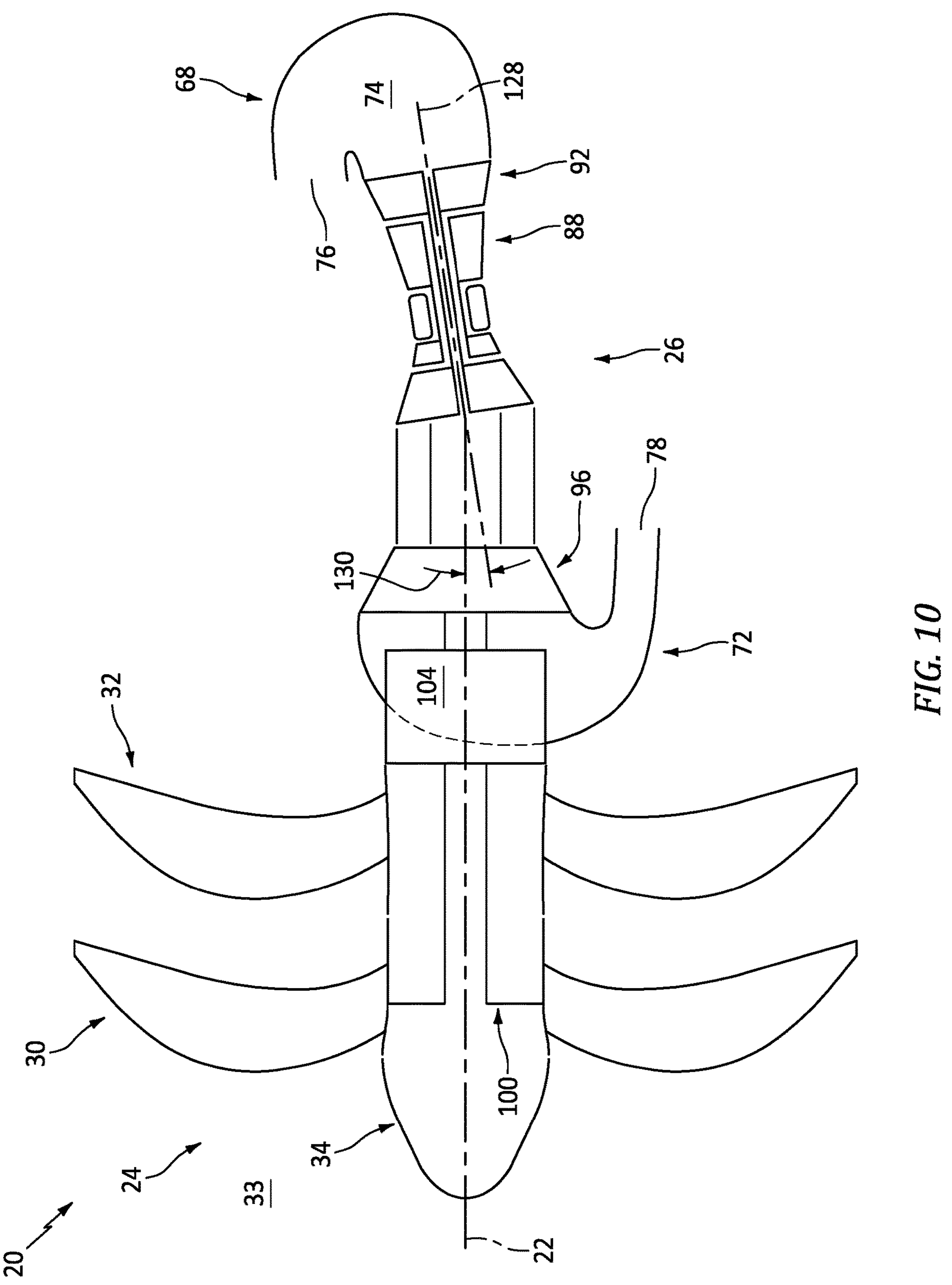
FIG. 10 is a sectional schematic illustration of another propulsion system.
Figure 11:
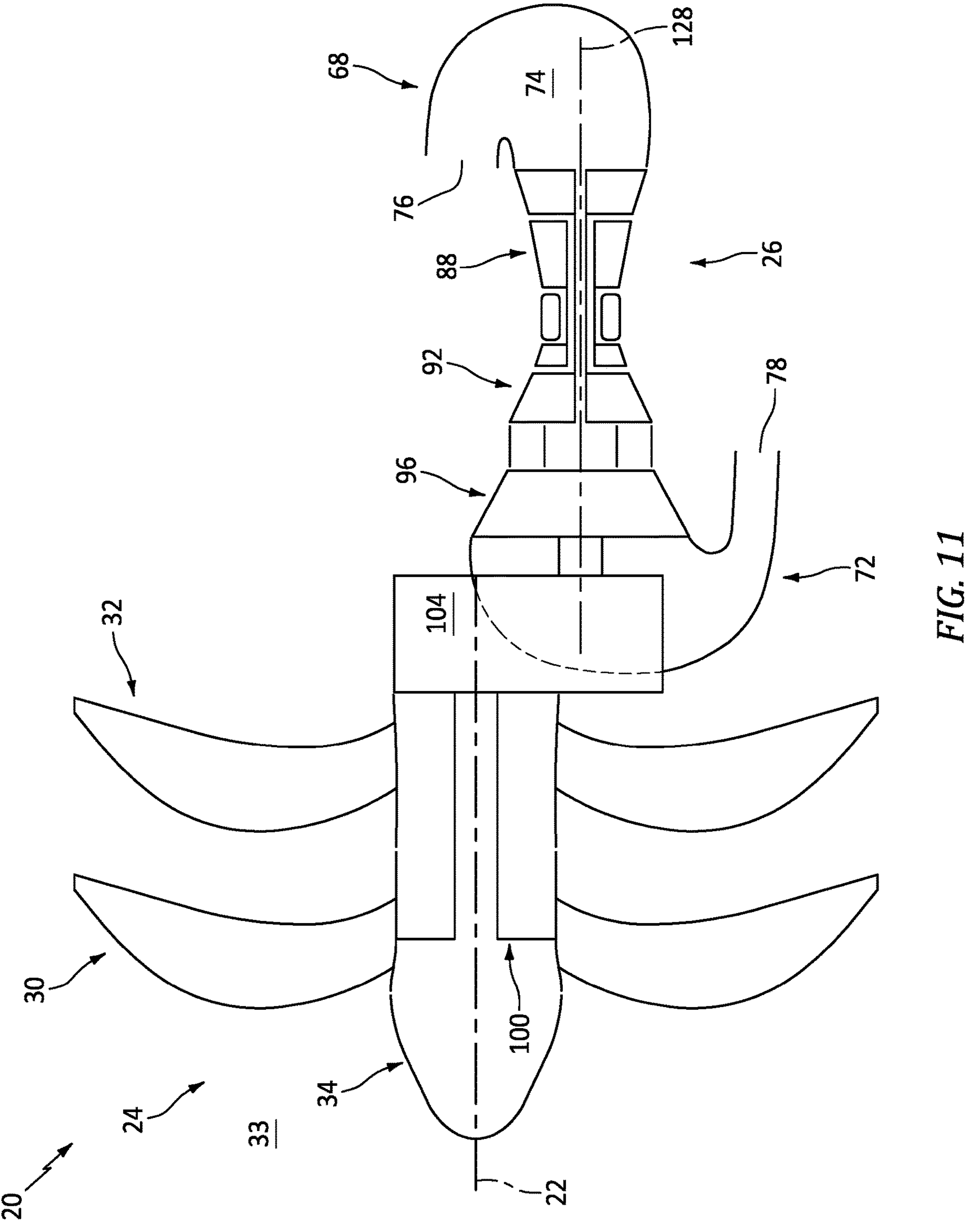
FIG. 11 is a sectional schematic illustration of still another propulsion system.

In some embodiments, referring to FIG. 1, the gas generator 26 and its rotating assemblies 88, 92 and 96 may be coaxial with the propulsion module 24 and its propulsor rotating assembly 100. In other embodiments, referring to FIGS. 10 and 11, one or more rotating assemblies 88 and 92 of the gas generator 26 may rotate about an axis 128 which is offset from the rotational axis—the axis 22—of the propulsor rotating assembly 100. The gas generator axis 128 of FIG. 10, for example, is angularly offset from the propulsor axis 22 by an included angle 130. This angle 130 is a non-zero acute angle less than, for example, thirty or forty-five degrees (30-45°); e.g., between one degree (1°) and five degrees (5°), between five degrees (5°) and ten degrees (10°), between ten degrees (10°) and twenty degrees (20°), etc. Here, the gas generator axis 128 is coincident with the propulsor axis 22; however, the present disclosure is not limited to such an exemplary arrangement. In another example, referring to FIG. 11, the gas generator axis 128 (and the power turbine axis) are laterally offset (e.g., spaced from) the propulsor axis 22. The axis 128, however, may be parallel with the propulsor axis 22.

The aircraft propulsion system 20 may include various gas generator configurations other than the ones described above. For example, while the gas generator 26 is described above with two core rotating assemblies 88 and 92, the gas generator 26 may alternatively be configured with a single core rotating assembly (e.g., 88 or 92) or three or more core rotating assemblies. Moreover, while the PT rotor 84 is described above as a free turbine rotor, it is contemplated the PT rotor 84 may alternatively be coupled to one of the core rotating assemblies 88, 92, or another compressor rotor.

The aircraft propulsion system 20 is described above with a tractor configuration; e.g., where the propulsor rotor 30 is disposed at or otherwise near the propulsion system upstream end 23. It is contemplated, however, the aircraft propulsion system 20 may be reversed to provide a pusher fan configuration. The present disclosure therefore is not limited to any particular open rotor propulsion system arrangement.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

a propulsion module comprising an open propulsor rotor, a nose cone and a plurality of open guide vanes arranged circumferentially about an axis, the plurality of open guide vanes including a first open guide vane;

a gas generator configured to drive rotation of the open propulsor rotor about the axis, the gas generator including a flowpath, a compressor section, a combustor section, a turbine section and an exhaust section, the flowpath extending through the compressor section, the combustor section, the turbine section and the exhaust section from an inlet into the flowpath to an exhaust from the flowpath, and the turbine section axially between the combustor section and the open propulsor rotor along the axis; and an anti-icing system configured to bleed gas from the flowpath in the exhaust section to provide heated gas, and the anti-icing system configured to direct the heated gas to the propulsion module to reduce or prevent ice accumulation on an exterior surface of the propulsion module;

wherein the exterior surface of the propulsion module comprises at least one of the nose cone, the first open guide vane or the open propulsor rotor.

2. The assembly of claim 1, wherein the anti-icing system includes a bleed port and a passage;

the bleed port is fluidly coupled to the passage and disposed in the exhaust section along the flowpath; and the passage extends into the first open guide vane.

3. The assembly of claim 2, wherein the anti-icing system further includes an outlet;

the outlet is disposed in the exterior surface; and the passage fluidly couples the bleed port to the outlet.

4. The assembly of claim 2, wherein the anti-icing system further includes an outlet;

the outlet is disposed in the exhaust section downstream of the bleed port along the flowpath; and the passage fluidly couples the bleed port to the outlet.

5. The assembly of claim 1, wherein the turbine section is axially between the combustor section and the plurality of open guide vanes along the axis.

6. The assembly of claim 1, wherein the anti-icing system includes a mixing valve configured to mix ambient air with the gas bled from the flowpath in the exhaust section to provide the heated gas.

7. The assembly of claim 1, wherein the heated gas consists of the gas bled from the flowpath in the exhaust section.

8. The assembly of claim 1, wherein the turbine section comprises a free power turbine rotor; and the free power turbine rotor is coupled to and configured to drive the rotation of the open propulsor rotor.

9. The assembly of claim 8, further comprising a geartrain coupling the free power turbine rotor to the open propulsor rotor.

10. The assembly of claim 8, wherein the free power turbine rotor is rotatable about the axis.

11. The assembly of claim 8, wherein the axis is a first axis, and the free power turbine rotor is rotatable about a second axis that is offset from the first axis.

12. The assembly of claim 1, wherein the gas generator comprises a rotating assembly rotatable about the axis; and the rotating assembly includes a compressor rotor, a turbine rotor and a shaft coupling the turbine rotor to the compressor rotor, the compressor rotor is in the compressor section, and the turbine rotor is in the turbine section.

13. The assembly of claim 1, wherein the axis is a first axis, and the gas generator comprises a rotating assembly rotatable about a second axis offset from the first axis; and the rotating assembly includes a compressor rotor, a turbine rotor and a shaft coupling the turbine rotor to the compressor rotor, the compressor rotor is in the compressor section, and the turbine rotor is in the turbine section.

14. The assembly of claim 2, wherein the first open guide vane comprises an external skin forming an outer surface of the first open guide vane and forming a peripheral boundary of the passage.

15. An assembly for an aircraft propulsion system, comprising:

a propulsion module comprising an open propulsor rotor and a plurality of open guide vanes arranged circumferentially about an axis, the plurality of open guide vanes including a first open guide vane;

a gas generator configured to drive rotation of the open propulsor rotor about the axis, the gas generator including a flowpath, a compressor section, a combustor section, a turbine section and an exhaust section, the flowpath extending through the compressor section, the combustor section, the turbine section and the exhaust section from an inlet into the flowpath to an exhaust from the flowpath, and the turbine section axially between the combustor section and the plurality of open guide vanes along the axis; and an anti-icing system configured to bleed gas from the flowpath in the exhaust section to provide heated gas, the anti-icing system configured to direct the heated gas to first open guide vane to reduce or prevent ice accumulation on an exterior surface of the propulsion module, and the exterior surface of the propulsion module comprising the first open guide vane.

* * * * *